US012750107B2

(12) United States Patent
Xiao et al.

(10) Patent No.: US 12,750,107 B2
(45) Date of Patent: Sep. 29, 2026

(54) METHOD FOR FEEDING BACK CHANNEL STATE INFORMATION, METHOD FOR RECEIVING CHANNEL STATE INFORMATION, AND TERMINAL, BASE STATION, AND COMPUTER-READABLE STORAGE MEDIUM

(71) Applicant: ZTE CORPORATION, Shenzhen (CN)

(72) Inventors: Huahua Xiao, Shenzhen (CN); Hao Wu, Shenzhen (CN); Zhaohua Lu, Shenzhen (CN); Lun Li, Shenzhen (CN); Zhengguang Gao, Shenzhen (CN); Xia Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 304 days.

(21) Appl. No.: 18/291,622

(22) PCT Filed: Aug. 2, 2022

(86) PCT No.: PCT/CN2022/109704
§ 371 (c)(1),
(2) Date: Jan. 24, 2024

(87) PCT Pub. No.: WO2023/011472
PCT Pub. Date: Feb. 9, 2023

(65) Prior Publication Data

US 2024/0372588 A1 Nov. 7, 2024

(30) Foreign Application Priority Data

Aug. 4, 2021 (CN) ........................ 202110893081.2

(51) Int. Cl.
*H04B 7/06* (2006.01)
*H04L 5/00* (2006.01)
*H04W 24/02* (2009.01)

(52) U.S. Cl.
CPC ......... *H04B 7/0626* (2013.01); *H04L 5/0005* (2013.01); *H04W 24/02* (2013.01)

(58) Field of Classification Search
CPC ..... H04B 7/0626; H04L 5/0005; H04W 24/02
See application file for complete search history.

(56) References Cited

U.S. PATENT DOCUMENTS

2019/0149266 A1 5/2019 Dikarev et al.
2020/0091970 A1* 3/2020 Lee ...................... H04B 7/0634
(Continued)

FOREIGN PATENT DOCUMENTS

CN 101577968 A 11/2009
CN 109672464 A 4/2019
(Continued)

OTHER PUBLICATIONS

European Patent Office, the Extended European Search Report dated May 7, 2025, for corresponding EP application No. 22852184.5.

(Continued)

*Primary Examiner* — Sujoy K Kundu
*Assistant Examiner* — Weibin Huang
(74) *Attorney, Agent, or Firm* — Li & Cai Intellectual Property (USA) Office

(57) ABSTRACT

Provided in the present disclosure is a method for feeding back channel state information, including: determining a neural network parameter, and constructing an encoder according to the neural network parameter; compressing channel information with the encoder to obtain channel state information; and feeding back the channel state information.

(Continued)

Further provided in the present disclosure are a method for receiving channel state information, and a terminal, a base station, and a computer-readable storage medium.

17 Claims, 5 Drawing Sheets

(56) References Cited

U.S. PATENT DOCUMENTS

| | | | | |
|---|---|---|---|---|
| 2020/0136704 | A1* | 4/2020 | Liu | H04B 7/0479 |
| 2020/0244329 | A1* | 7/2020 | Xiao | H04B 17/328 |
| 2021/0184744 | A1 | 6/2021 | Pezeshki et al. | |
| 2021/0195462 | A1 | 6/2021 | Pezeshki et al. | |
| 2022/0052827 | A1* | 2/2022 | Vitthaladevuni | H04L 5/0048 |
| 2022/0070822 | A1* | 3/2022 | Behboodi | G01S 5/0273 |
| 2023/0318675 | A1* | 10/2023 | Xu | H04B 7/0456<br>455/101 |
| 2024/0154675 | A1* | 5/2024 | Shi | H04B 7/0626 |

FOREIGN PATENT DOCUMENTS

| | | | |
|---|---|---|---|
| CN | 110350958 | A | 10/2019 |
| CN | 111434049 | A | 7/2020 |
| CN | 113098805 | A | 7/2021 |
| WO | WO2018137187 | A1 | 8/2018 |
| WO | WO2018223351 | A1 | 12/2018 |
| WO | WO 2020091542 | A1 | 5/2020 |

OTHER PUBLICATIONS

WIPO, International Search Report issued on Oct. 28, 2022.

* cited by examiner

METHOD FOR FEEDING BACK CHANNEL STATE INFORMATION, METHOD FOR RECEIVING CHANNEL STATE INFORMATION, AND TERMINAL, BASE STATION, AND COMPUTER-READABLE STORAGE MEDIUM

CROSS-REFERENCE TO RELATED APPLICATIONS

This application is a National Phase Application filed under 35 U.S.C. 371 as a national stage of PCT/CN2022/109704, filed on Aug. 2, 2022, an application claiming priority to Chinese patent application No. 202110893081.2 filed on Aug. 4, 2021, the entirety of which is incorporated hereby by reference.

TECHNICAL FIELD

The present disclosure relates to the field of communication technologies, and particularly relates to a method for feeding back channel state information, a method for receiving channel state information, and a terminal, a base station, and a computer-readable storage medium.

BACKGROUND

As one of the important means for improving wireless communication performance, the multi-antenna technology has been widely applied to standards such as long term evolution (LTE), long term evolution-advanced (LTE-A), new radio access technology (NR), and the like. To fully utilize performance of the multi-antenna technology in systems such as frequency division multiplexing, a terminal is desired to feed back channel state information (CSI). The channel state information includes, but is not limited to, a rank of the channel, a precoding matrix matched with the channel, or the like. The more accurate the channel state information is, the higher performance of the multi-antenna technology can be utilized; and the more accurate channel state information is fed back, the higher feedback overhead is involved. For example, the number of bits involved in feedback of a type II codebook in NR is as large as several hundreds.

In some existing art, it is impossible to balance the accuracy of the channel state information and the feedback overhead.

SUMMARY

In a first aspect, an embodiment of the present disclosure provides a method for feeding back channel state information, including: determining a neural network parameter, and constructing an encoder according to the neural network parameter; compressing channel information with the encoder to obtain channel state information; and feeding back the channel state information.

In a second aspect, an embodiment of the present disclosure provides a method for receiving channel state information, including: determining a neural network parameter, and constructing a decoder according to the neural network parameter; receiving channel state information; and decompressing the channel state information with the decoder to obtain second channel information.

In a third aspect, an embodiment of the present disclosure provides a terminal, including: at least one processor; and a memory having at least one computer program stored thereon which, when executed by the at least one processor, causes the at least one processor to implement the method for feeding back channel state information according to any embodiment of the present disclosure in the first aspect; and at least one I/O interface connected between the processor and the memory and configured to enable information interaction between the processor and the memory.

In a fourth aspect, an embodiment of the present disclosure provides a base station, including: at least one processor; and a memory having at least one computer program stored thereon which, when executed by the at least one processor, causes the at least one processor to implement the method for receiving channel state information according to any embodiment of the present disclosure in the second aspect; and at least one I/O interface connected between the processor and the memory and configured to enable information interaction between the processor and the memory.

In a fifth aspect, an embodiment of the present disclosure provides a computer-readable storage medium storing a computer program thereon which, when executed by a processor, causes at least one of the method for feeding back channel state information according to any embodiment of the present disclosure in the first aspect, or the method for receiving channel state information according to any embodiment of the present disclosure in the second aspect, to be implemented.

DETAIL DESCRIPTION OF EMBODIMENTS

Figure 1:
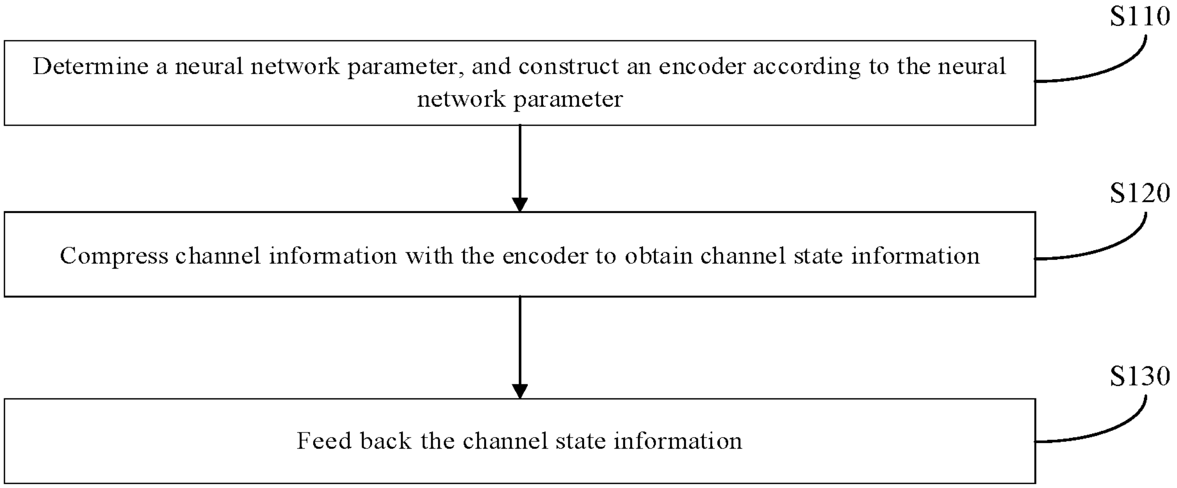
FIG. 1 is a flowchart of a method for feeding back channel state information according to an embodiment of the present disclosure.

To improve understanding of the technical solution of the present disclosure for those skilled in the art, the following describes the method for feeding back channel state information, the method for receiving channel state information, the terminal, the base station, and the computer-readable storage medium of the present disclosure in detail with reference to the accompanying drawings.

Example embodiments will be described more sufficiently below with reference to the accompanying drawings, but which may be embodied in different forms and should not be construed as limited to the embodiments set forth herein. These embodiments are provided so that the present disclosure will be more thorough and complete, and will fully convey the scope of the present disclosure to those skilled in the art.

The embodiments of the present disclosure and features thereof may be combined with each other as long as they are not contradictory.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "include" and/or "made of . . . " specify the presence of specific features, integers, operations, operations, elements, and/or components, but do not preclude the presence or addition of one or more other features, entities, operations, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Artificial intelligence (AI), with strong capabilities of feature extraction, classification, and the like, is now widely applied in various industries. How to apply AI, which is mainly implemented by a deep learning neural network, to feedback of channel state information in the multi-antenna technology is a subject very worthy of study. With the application of AI, less feedback overhead can be used to achieve the same performance as a conventional codebook. However, in some existing art, a fully-connected layer, which is fixed in terms of the input and output dimensions, is present in the neural network for feeding back CSI, and thus, different neural networks are desired for scenarios of different antenna numbers, different transmission data streams, or different bandwidths, leading to increased overhead or complexity of the wireless communication system.

In a first aspect, referring to FIG. 1, an embodiment of the present disclosure provides a method for feeding back channel state information, including the following operations S110 to S130.

At operation S110, a neural network parameter is determined, and an encoder is constructed according to the neural network parameter.

At operation S120, channel information is compressed with the encoder to obtain channel state information.

At operation S130, the channel state information is fed back.

In the method for feeding back channel state information according to the embodiment of the present disclosure, an encoder in a terminal and a decoder in a base station are constructed based on a neural network. The encoder in the terminal corresponds to the decoder in the base station, which means that when the neural network parameter of either one of the terminal and the base station is determined, the neural network parameter of the other one is also determined. The encoder in the terminal and the decoder in the base station jointly constitute an AutoEncoder.

In the method for feeding back channel state information according to the embodiment of the present disclosure, the neural network parameter determined in operation S110 includes a neural network parameter of one AutoEncoder selected from neural network parameters of a set of a plurality of AutoEncoders obtained through offline training or through a combination of offline training and online training. The determined neural network parameter in the terminal corresponds to the neural network parameter in the base station.

It should be noted that in the method for feeding back channel state information according to the embodiment of the present disclosure, the channel information is obtained by the terminal through receiving a reference signal, such as a channel state information reference signal (CSI-RS). In the base station, the channel information can be acquired by decoding the channel state information fed back from the terminal with a decoder corresponding to the encoder in the terminal.

It should be further noted that, in the embodiments of the present disclosure, the terminal may include a mobile phone, a data card, a laptop, or various mobile manufacturing devices of a factory, which is not particularly limited herein. The base station may include various base stations such as macro, micro, home, or pico base stations, which is also not particularly limited herein.

In the method for feeding back channel state information according to the embodiment of the present disclosure, the terminal or the base station can determine the neural network parameter according to at least one factor, such as a scene of channel, angle spread, delay spread, or Doppler spread of channel, or the like, and the terminal and the base station can exchange the neural network parameter information so that the corresponding neural network parameters are used to construct a corresponding encoder in the terminal and a corresponding decoder in the base station, respectively, thereby enabling feedback of the channel state information in scenarios of different antenna numbers, different transmission data streams, or different bandwidths, and reducing the overhead and complexity of wireless communication.

Figure 2:
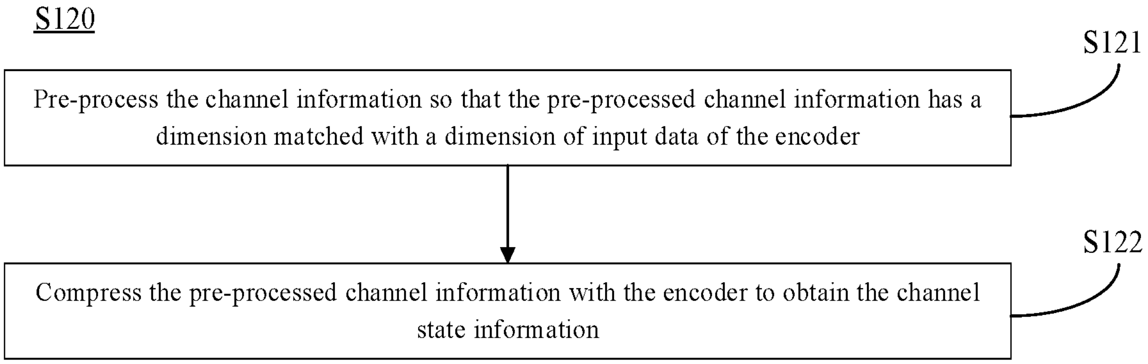
FIG. 2 is a flowchart illustrating some operations in a method for feeding back channel state information according to an embodiment of the present disclosure.

In some implementations, referring to FIG. 2, the operation S120 includes operations S121 and S122.

At operation S121, the channel information is pre-processed so that the pre-processed channel information has a dimension matched with a dimension of input data of the encoder.

At operation S122, the pre-processed channel information is compressed with the encoder to obtain the channel state information.

It should be noted that in the method for feeding back channel state information according to the embodiment of the present disclosure, after the neural network parameter is determined, a dimension of the input data of the encoder is also determined accordingly. The encoder may only process channel information for a specific antenna number or a specific transmission data stream. In the method for feeding back channel state information according to the embodiment of the present disclosure, the pre-processed channel information having a dimension matched with a dimension of input data of the encoder means that the channel information is pre-processed and converted to conform to the dimension of the input data of the encoder.

It should be further noted that, in the embodiments of the present disclosure, the channel information may be time domain channel information or frequency domain channel information, which is not particularly limited herein.

In some implementations, pre-processing the channel information so that the pre-processed channel information has a dimension matched with a dimension of input data of the encoder includes:

determining a group number K of the channel information according to the dimension of the channel information and the dimension of the input data of the encoder; and dividing the channel information into K groups to obtain K groups of channel information as the pre-processed channel information. Each group of channel information has a dimension matched with the dimension of the input data of the encoder, and K is a positive integer.

Figure 3:
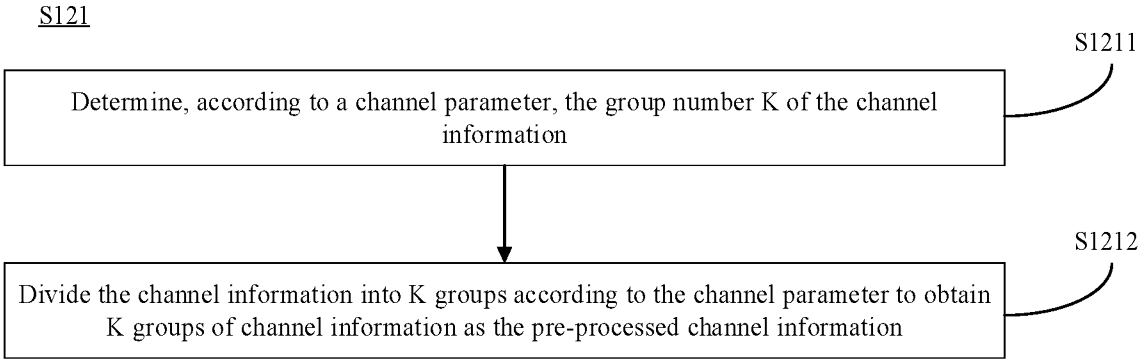
FIG. 3 is a flowchart illustrating some operations in a method for feeding back channel state information according to an embodiment of the present disclosure.

In some implementations, referring to FIG. 3, the operation S121 includes operations S1211 and S1212.

At operation S1211, the group number K of the channel information is determined according to a channel parameter.

At operation S1212, the channel information is divided into K groups according to the channel parameter to obtain K groups of channel information as the pre-processed channel information, wherein each group of channel information has a dimension matched with the dimension of the input data of the encoder, where K is a positive integer, and the channel parameter includes at least one of: the number of antenna polarization directions, the number of antennas, the number of data streams, the number of time domain sampling point sets, or the number of frequency domain granularity sets.

In the embodiments of the present disclosure, the number of antennas may be the number of receiving antennas and/or the number of transmitting antennas, which is not particularly limited herein.

How to divide the channel information into K groups according to the channel parameter is not particularly limited herein.

In some implementations, dividing the channel information into K groups according to the channel parameter includes at least one of:

grouping the channel information according to the number of antenna polarization directions;

grouping the channel information according to the number of antennas;

grouping the channel information according to the number of data streams;

grouping the channel information according to the number of time domain sampling point sets; or grouping the channel information according to the number of frequency domain granularity sets.

It should be noted that in the method for feeding back channel state information according to the embodiment of the present disclosure, dividing the channel information into K groups according to the channel parameter may include dividing the channel information into K groups according to any one of the number of antenna polarization directions, the number of antennas, the number of data streams, the number of time domain sampling point sets, or the number of frequency domain granularity sets; or dividing the channel information into K groups according to a plurality of channel parameters, which is not particularly limited herein. When the channel information is divided into K groups according to a plurality of channel parameters, for example, when the channel information is divided into K groups according to the number of antenna polarization directions and the number of antennas, it may include firstly performing preliminary grouping according to the number of antenna polarization directions, and then performing further grouping according to the number of antennas on the basis of the preliminary grouping, finally obtaining K groups of channel information; or firstly performing preliminary grouping according to the number of antennas, and then performing further grouping according to the number of antenna polarization directions on the basis of the preliminary grouping, finally obtaining K groups of channel information.

In some implementations, the channel information is H, which is a matrix of Nt*Ns*C, where Nt represents the number of antennas, Ns represents the number of sampling point sets, and C represents the channel dimension. The channel information H may be a matrix obtained by performing fast Fourier transform on the obtained channel information to obtain a time domain channel/frequency domain channel, and then truncating the obtained time domain channel/frequency domain channel at time domain/frequency domain points and performing normalization on the truncated time domain channel/frequency domain channel.

Accordingly, in some implementations, grouping the channel information according to the number of antenna polarization directions includes:

dividing channel information corresponding to the same polarization direction into the same group of channel information.

In some implementations, grouping the channel information according to the number of antenna polarization directions further includes:

before dividing channel information corresponding to the same polarization direction into the same group of channel information, ranking the channel information according to the antenna polarization direction.

In the method for feeding back channel state information according to the embodiment of the present disclosure, ranking the channel information according to the antenna polarization direction may be based on rows or blocks in the matrix of the channel information, which is not particularly limited herein. In the case of ranking based on blocks, one polarization direction corresponds to one block, and one block may correspond to continuous or discontinuous channel(s), which is also not particularly limited herein. For example, in the case of ranking based on blocks, channel information corresponding to a polarization direction 1 as a whole is arranged before that corresponding to a polarization direction 2, the polarization direction 1 does not necessarily correspond to continuous channel(s), and the polarization direction 2 does not necessarily correspond to continuous channel(s), either.

Accordingly, in some implementations, grouping the channel information according to the number of antennas includes:

dividing channel information corresponding to the same antenna group into the same group of channel information.

The antenna group includes a transmitting antenna group and/or a receiving antenna group.

In some implementations, grouping the channel information according to the number of antennas further includes:

before dividing channel information corresponding to the same antenna group into the same group of channel information, ranking the channel information according to indexes of antennas.

It should be noted that, in the embodiments of the present disclosure, the antenna includes a transmitting antenna and/or a receiving antenna.

In the method for feeding back channel state information according to the embodiment of the present disclosure, ranking the channel information according to indexes of antennas may be based on rows or blocks in the matrix of the channel information, which is not particularly limited herein. In the case of ranking based on blocks, one antenna group corresponds to one block, and one block may correspond to continuous or discontinuous channel(s), which is also not particularly limited herein. For example, in the case of ranking based on antenna groups, channel information corresponding to an antenna group i as a whole is ranked before channel information corresponding to an antenna group j, where i<j; the antenna group i does not necessarily correspond continuous channel(s), and the antenna group j does not necessarily correspond continuous channel(s), either.

Accordingly, in some implementations, grouping the channel information according to the number of data streams includes:

dividing channel information corresponding to the same data stream into the same group of channel information.

In some implementations, grouping the channel information according to the number of data streams further includes:

before dividing channel information corresponding to the same data stream into the same group of channel information, ranking the channel information according to indexes of data streams.

In the method for feeding back channel state information according to the embodiment of the present disclosure, ranking the channel information according to indexes of data streams may be based on rows or blocks in the matrix of the channel information, which is not particularly limited herein. In the case of ranking based on blocks, one data stream corresponds to one block, and one block may correspond to continuous or discontinuous channel(s), which is also not particularly limited herein. For example, in the case of ranking based on data streams, channel information corresponding to a data stream i as a whole is ranked before channel information corresponding to a data stream j, where i<j; the data stream i does not necessarily correspond continuous channel(s), and the data stream j does not necessarily correspond continuous channel(s), either.

Accordingly, in some implementations, grouping the channel information according to the number of time domain sampling point sets includes:

dividing channel information corresponding to the same sampling point set into the same group of channel information.

In some implementations, grouping the channel information according to the number of time domain sampling point sets further includes:

before dividing channel information corresponding to the same sampling point set into the same group of channel information, ranking the channel information according to size indexes of sampling points.

In the method for feeding back channel state information according to the embodiment of the present disclosure, ranking the channel information according to size indexes of sampling points may be based on rows or blocks in the matrix of the channel information, which is not particularly limited herein. In the case of ranking based on blocks, one sampling point set corresponds to one block, and one block may correspond to continuous or discontinuous channel(s), which is also not particularly limited herein. For example, in the case of ranking based on sampling point sets, channel information corresponding to a sampling point set i as a whole is ranked before channel information corresponding to a sampling point set j, where i<j; the sampling point set i does not necessarily correspond continuous channel(s), and the sampling point set j does not necessarily correspond continuous channel(s), either.

In some implementations, the sampling points are ranked from large to small according to their indexes and divided into K groups, i.e., form K sampling point sets, assuming that an index set of an $i^{th}$ sampling point set is Bi=integers from $Ns/K*(i-1)+1$ to $Ns/K*i$, and the $i^{th}$ sampling point set corresponds to the channel information H(:, Bi, :), i=1, . . . , K, where K is a positive integer.

Accordingly, in some implementations, grouping the channel information according to the number of frequency domain granularity sets includes:

dividing channel information corresponding to the same frequency domain granularity set into the same group of channel information.

In some implementations, grouping the channel information according to the number of frequency domain granularity sets further includes:

before dividing channel information corresponding to the same frequency domain granularity set into the same group of channel information, ranking the channel information according to indexes of frequency domain granularities.

In the method for feeding back channel state information according to the embodiment of the present disclosure, ranking the channel information according to indexes of frequency domain granularities may be based on rows or blocks in the matrix of the channel information, which is not particularly limited herein. In the case of ranking based on blocks, one frequency domain granularity set corresponds to one block, and one block may correspond to continuous or discontinuous channel(s), which is also not particularly limited herein. For example, in the case of ranking based on frequency domain granularity sets, channel information corresponding to a frequency domain granularity set i as a whole is ranked before channel information corresponding to a frequency domain granularity set j, where i<j; the frequency domain granularity set i does not necessarily correspond continuous channel(s), and the frequency domain granularity set j does not necessarily correspond continuous channel(s), either.

In some implementations, the frequency domain granularity may be in units of subcarriers or physical resource blocks or sub-bands, one physical resource block may include a plurality of subcarriers, one sub-band may include a plurality of physical resource blocks, and one or more frequency domain granularities form one frequency domain granularity set.

In some implementations, the frequency domain granularities are ranked by size and divided into K groups, assuming that an index set of an $i^{th}$ frequency domain granularity set is Ci=integers from Nf/K*(i−1)+1 to Nf/K*i, and the $i^{th}$ frequency domain granularity set corresponds to the channel information H (:, Ci, :), i=1, . . . , K, where K is a positive integer.

In some implementations, compressing the pre-processed channel information with the encoder to obtain the channel state information includes: compressing each of the K groups of channel information with the encoder, respectively, to obtain K groups of channel state information.

In some implementations, the method for feeding back channel state information further includes:

after compressing each of the K groups of channel information with the encoder, respectively, to obtain K groups of channel state information, acquiring and feeding back an inter-group phase of the groups of channel information.

In some implementations, the method for feeding back channel state information further includes:

after compressing each of the K groups of channel information with the encoder, respectively, to obtain K groups of channel state information, performing, according to group indexes corresponding to the K groups of channel state information, joint coding on the K groups of channel state information.

In some implementations, when a channel parameter of the channel information, such as the number of antennas or the number of sampling point sets, is greater than a channel parameter corresponding to the determined neural network parameter, for example, when the number of antennas in the channel information is greater than the number of antennas corresponding to the determined neural network parameter, the pre-processing may further include downsampling so that the pre-processed channel information has a dimension matched with a dimension of input data of the encoder.

Figure 4:
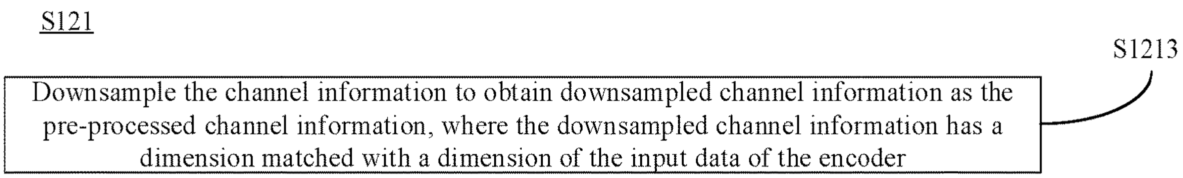
FIG. 4 is a flowchart illustrating some operations in a method for feeding back channel state information according to an embodiment of the present disclosure.

In some implementations, referring to FIG. 4, the operation S121 includes operation S1213.

At operation S1213, the channel information is downsampled to obtain downsampled channel information as the pre-processed channel information, where the downsampled channel information has a dimension matched with a dimension of the input data of the encoder.

How to downsample the channel information is not particularly limited in the present disclosure.

In some implementations, downsampling the channel information includes at least one of:

performing downsampling on the channel information in an antenna dimension;

performing downsampling on the channel information in a time domain sampling point dimension; or performing downsampling on the channel information in a frequency domain granularity dimension.

In some implementations, when a channel parameter of the channel information, such as the number of antennas or the number of sampling point sets, is less than a channel parameter corresponding to the determined neural network parameter, for example, when the number of antennas in the channel information is less than the number of antennas corresponding to the determined neural network parameter, the pre-processing may further include zero padding so that the pre-processed channel information has a dimension matched with a dimension of the input data of the encoder.

Figure 5:
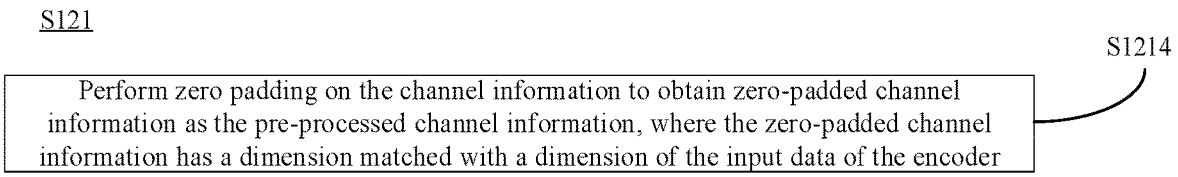
FIG. 5 is a flowchart illustrating some operations in a method for feeding back channel state information according to an embodiment of the present disclosure.

In some implementations, referring to FIG. 5, the operation S121 includes operation S1214.

At operation S1214, zero padding is performed on the channel information to obtain zero-padded channel information as the pre-processed channel information, where the zero-padded channel information has a dimension matched with a dimension of the input data of the encoder.

How to perform zero padding on the channel information is not particularly limited in the present disclosure.

In some implementations, performing zero padding on the channel information includes at least one of:

performing zero padding on the channel information in an antenna dimension in the same polarization direction;

performing zero padding on the channel information in a time domain sampling point dimension; or performing zero padding on the channel information in a frequency domain granularity dimension.

Figure 6:
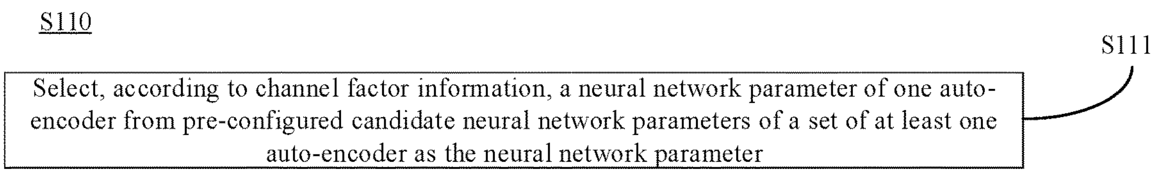
FIG. 6 is a flowchart illustrating some operations in a method for feeding back channel state information according to an embodiment of the present disclosure.

In some implementations, referring to FIG. 6, the operation S110 includes operation S111.

At operation S111, a neural network parameter of one AutoEncoder is selected, according to channel factor information, from pre-configured candidate neural network parameters of a set of at least one AutoEncoder as the neural network parameter. The AutoEncoder includes a pair of encoder and decoder.

Figure 7:
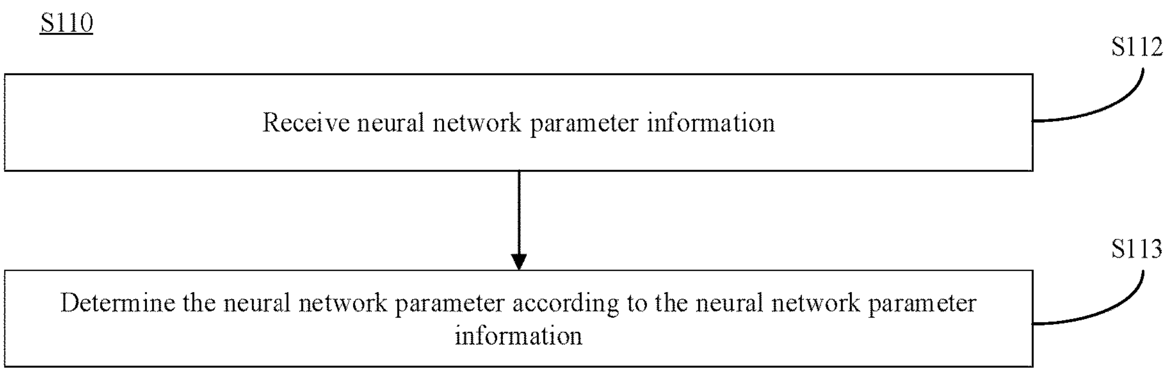
FIG. 7 is a flowchart illustrating some operations in a method for feeding back channel state information according to an embodiment of the present disclosure.

In some implementations, referring to FIG. 7, the operation S110 includes operations S112 and S113.

At operation S112, neural network parameter information is received.

At operation S113, the neural network parameter is determined according to the neural network parameter information.

It should be noted that, in some implementations, after determining the neural network parameter according to a channel condition, the base station directly sends the neural network parameter to the terminal, and the neural network parameter information received by the terminal in operation S112 is the neural network parameter. In some implementations, the terminal and the base station respectively store neural network parameters of multiple pairs of encoders and decoders, and when in use, the base station sends an index of a pair of encoder and decoder to the terminal through higher-layer signaling according to the channel condition, so the neural network parameter information received by the terminal in operation S112 is the index of the pair of encoder and decoder, and the terminal knows from which pair the neural network parameter of the encoder is used upon receiving the index.

In some implementations, the neural network parameter includes at least one of a convolutional layer kernel size, the number of convolutional layers, a convolutional layer step, a convolutional layer weight, a convolutional layer bias, or an activation function of a convolutional layer.

In some implementations, the encoder includes a first processing layer and a compression layer; the first processing layer includes a plurality of network layers, each of which includes a plurality of nodes, at least one network layer weight, an activation function, and/or a network layer bias, and the first processing layer is configured to extract a feature of the channel information; and the compression layer is configured to compress the feature of the channel information to obtain the channel state information.

In some implementations, the compression layer includes any one of a fully-connected layer, a convolutional layer set, or a Recurrent Neural Network, and the convolutional layer set includes at least one convolutional layer.

Figure 8:
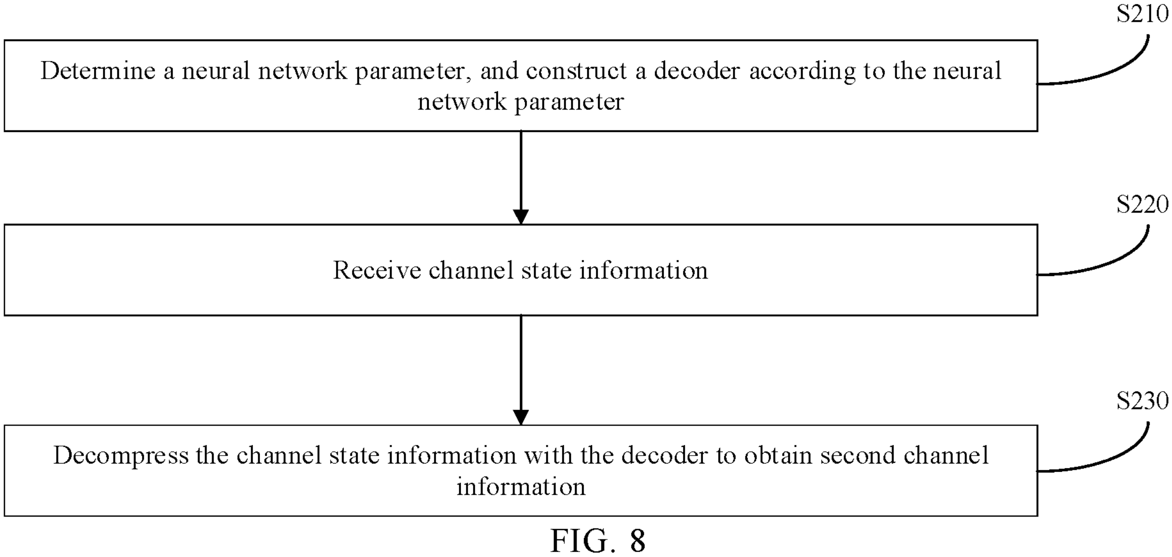
FIG. 8 is a flowchart of a method for receiving channel state information according to an embodiment of the present disclosure.

In a second aspect, referring to FIG. 8, an embodiment of the present disclosure provides a method for receiving channel state information, including the following operations S210 to S230.

At operation S210, a neural network parameter is determined, and a decoder is constructed according to the neural network parameter.

At operation S220, channel state information is received.

At operation S230, the channel state information is decompressed with the decoder to obtain second channel information.

In the method for receiving channel state information according to the embodiment of the present disclosure, an encoder in a terminal and a decoder in a base station are constructed based on a neural network. The encoder in the terminal corresponds to the decoder in the base station, which means that when the neural network parameter of either one of the terminal and the base station is determined, the neural network parameter of the other one is also determined. The encoder in the terminal and the decoder in the base station jointly constitute an AutoEncoder.

In the method for receiving channel state information according to the embodiment of the present disclosure, the neural network parameter determined in operation S210 includes a neural network parameter of one AutoEncoder selected from neural network parameters of a set of a plurality of AutoEncoders obtained through offline training or through a combination of offline training and online training. The determined neural network parameter in the terminal corresponds to the neural network parameter in the base station.

It should be noted that in the method for receiving channel state information according to the embodiment of the present disclosure, the terminal obtained the channel information by receiving a reference signal, such as a channel state information reference signal (CSI-RS). In the base station, the second channel information can be acquired by decoding the channel state information fed back from the terminal with a decoder corresponding to the encoder in the terminal. In some implementations, the second channel information acquired in the base station is an estimated value of the channel information acquired by the terminal.

It should be further noted that, in the embodiments of the present disclosure, the terminal may include a mobile phone, a data card, a laptop, or various mobile manufacturing devices of a factory, which is not particularly limited herein. The base station may include various base stations such as macro, micro, home, or pico base stations, which is also not particularly limited herein.

In the method for receiving channel state information according to the embodiment of the present disclosure, the terminal or the base station can determine the neural network parameter according to at least one factor, such as a scene of channel, angle spread, delay spread, or Doppler spread of channel, or the like, and the terminal and the base station can exchange the neural network parameter information so that the corresponding neural network parameters are used to construct a corresponding encoder in the terminal and a corresponding decoder in the base station, respectively, thereby enabling feedback of the channel state information in scenarios of different antenna numbers, different transmission data streams, or different bandwidths, and reducing the overhead and complexity of wireless communication.

In some implementations, the channel state information includes K groups of channel state information obtained by compressing each of K groups of channel information, respectively; and decompressing the channel state information with the decoder to obtain the second channel information includes:

decompressing each of the K groups of channel state information, respectively, to obtain K groups of channel information; and acquiring the second channel information according to the K groups of channel information; where K is a positive integer.

In some implementations, acquiring the second channel information according to the K groups of channel information includes:

combining the K groups of channel information according to a channel parameter to obtain the second channel information.

The channel parameter includes at least one of: the number of antenna polarization directions, the number of antennas, the number of data streams, the number of time domain sampling point sets, or the number of frequency domain granularity sets.

In the embodiments of the present disclosure, the number of antennas may be the number of receiving antennas and/or transmitting antennas, which is not particularly limited herein.

In some implementations, the terminal performs, according to group indexes corresponding to the K groups of channel state information, joint coding on the K groups of channel state information. After receiving the jointly coded channel state information, the base station is desired to perform joint decoding.

Accordingly, in some implementations, the method for receiving channel state information further includes:

before decompressing the channel state information with the decoder to obtain the second channel information, performing, according to group indexes corresponding to the K groups of channel state information, joint decoding on the K groups of channel state information.

In some implementations, the terminal downsamples the channel information to obtain downsampled channel information as the pre-processed channel information, and compresses the pre-processed channel information with the encoder to obtain channel state information. In the base station, after decompressing the channel state information, the second channel information is further obtained by means of upsampling, differencing, deconvolution, and the like.

Accordingly, in some implementations, decompressing the channel state information with the decoder to obtain the second channel information includes:

decompressing the channel state information with the decoder to obtain downsampled channel information; and performing upsampling according to the downsampled channel information to obtain the second channel information.

How to perform the upsampling is not particularly limited in the present disclosure. For example, the upsampling is performed in the base station in a manner corresponding to the downsampling in the terminal.

Accordingly, in some implementations, performing upsampling according to the downsampled channel information to obtain the second channel information includes at least one of:

performing upsampling in an antenna dimension;

performing upsampling in a time domain sampling point dimension; or performing upsampling in a frequency domain granularity dimension.

In some implementations, the terminal performs zero padding on the channel information to obtain zero-padded channel information as the pre-processed channel information, and compresses the pre-processed channel information with the encoder to obtain channel state information. In the base station, after decompressing the channel state information, the second channel information is further obtained by zero removal.

Accordingly, in some implementations, decompressing the channel state information with the decoder to obtain the second channel information includes:

decompressing the channel state information with the decoder to obtain zero-padded channel information; and performing zero removal according to the zero-padded channel information to obtain the second channel information.

How to perform the zero removal is not particularly limited in the present disclosure. For example, the zero removal is performed in the base station in a manner corresponding to the zero padding in the terminal.

Accordingly, in some implementations, performing zero removal according to the zero-padded channel information to obtain the second channel information includes at least one of:

performing zero removal in an antenna dimension in the same polarization direction;

performing zero removal in a time domain sampling point dimension; or performing zero removal in a frequency domain granularity dimension.

In some implementations, the determining the neural network parameter, and constructing the decoder according to the neural network parameter includes:

selecting, according to channel factor information, a neural network parameter of one AutoEncoder from preconfigured candidate neural network parameters of a set of at least one AutoEncoder as the neural network parameter. The AutoEncoder includes a pair of encoder and decoder.

In some implementations, the determining the neural network parameter, and constructing the encoder according to the neural network parameter includes:

receiving neural network parameter information; and determining the neural network parameter according to the neural network parameter information.

It should be noted that, in some implementations, the terminal determines the neural network parameter according to information of at least one channel factor, such as a scene of channel, angle spread, delay spread, or Doppler spread of channel, or the like, and directly sends the neural network parameter to the base station, and the neural network parameter information received by the base station is the neural network parameter. In some implementations, the terminal and the base station respectively store neural network parameters of multiple pairs of encoders and decoders, and when in use, the terminal determines the neural network parameter according to information of at least one channel factor, such as a scene of channel, angle spread, delay spread, or Doppler spread of channel, or the like, and sends an index of a pair of encoder and decoder to the base station through higher-layer signaling, and the base station knows from which pair the neural network parameter of the decoder is used upon receiving the index.

In some implementations, the neural network parameter includes at least one of a convolutional layer kernel size, the number of convolutional layers, a convolutional layer step, a convolutional layer weight, a convolutional layer bias, or an activation function of a convolutional layer.

In some implementations, the decoder includes a second processing layer and a decompression layer; the decompression layer is configured to decompress the channel state information; and the second processing layer includes a plurality of network layers, each of which includes a plurality of nodes, at least one network layer weight, an activation function, and/or a network layer bias, and the second processing layer is configured to extract a feature of decompressed channel state information to obtain the second channel information.

In some implementations, the decompression layer includes any one of a fully-connected layer, a deconvolutional layer set, or a Recurrent Neural Network.

Figure 9:
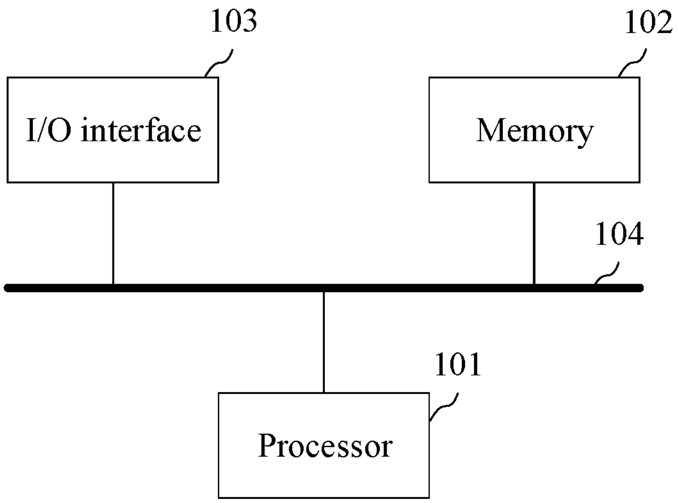
FIG. 9 is a block diagram of a terminal according to an embodiment of the present disclosure.

In a third aspect, referring to FIG. 9, an embodiment of the present disclosure provides a terminal, including:

at least one processor 101 (merely one is shown in FIG. 9);

a memory 102 having at least one computer program stored thereon which, when executed by the at least one processor 101, causes the at least one processor 101 to implement the method for feeding back channel state information according to any embodiment of the present disclosure in the first aspect; and at least one Input/Output (I/O) interface 103 connected between the at least one processor 101 and the memory 102 and configured to enable information interaction between the at least one processor 101 and the memory 102.

The processor 101 is a device with a data processing capability, including but not limited to a central processing unit (CPU), or the like. The memory 102 is a device with a data storage capability, including but not limited to, a random access memory (RAM, more specifically SDRAM, DDR, etc.), a read-only memory (ROM), an electrically erasable programmable read-only memory (EEPROM) or a flash memory (FLASH). The I/O interface (read/write interface) 103 is connected between the processor 101 and the memory 102 to enable information interaction between the processor 101 and the memory 102, and includes, but is not limited to, a bus or the like.

In some implementations, the processor 101, the memory 102, and the I/O interface 103 are interconnected via a bus 104, and further connected to other components of a computing device.

Figure 10:
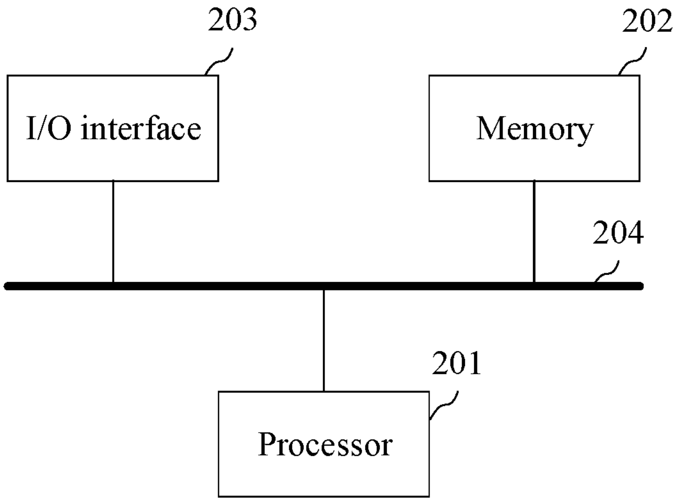
FIG. 10 is a block diagram of a base station according to an embodiment of the present disclosure.

In a fourth aspect, referring to FIG. 10, an embodiment of the present disclosure provides a base station, including:

at least one processor 201 (merely one is shown in FIG. 10);

a memory 202 having at least one computer program stored thereon which, when executed by the at least one processor 201, causes the at least one processor 201 to implement the method for receiving channel state information according to any embodiment of the present disclosure in the second aspect; and at least one I/O interface 203 connected between the at least one processor 201 and the memory 202 and configured to enable information interaction between the at least one processor 201 and the memory 202.

The processor 201 is a device with a data processing capability, including but not limited to a central processing unit (CPU), or the like. The memory 202 is a device with a data storage capability, including but not limited to, a random access memory (RAM, more specifically SDRAM, DDR, etc.), a read-only memory (ROM), an electrically erasable programmable read-only memory (EEPROM) or a flash memory (FLASH). The I/O interface (read/write interface) 203 is connected between the processor 201 and the memory 202 to enable information interaction between the processor 201 and the memory 202, and includes, but is not limited to, a bus or the like.

In some implementations, the processor 201, the memory 202, and the I/O interface 203 are interconnected via a bus 204, and further connected to other components of a computing device.

Figure 11:
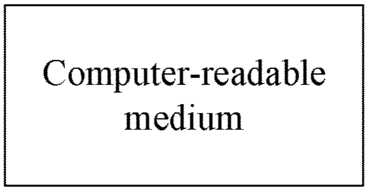
FIG. 11 is a block diagram of a computer-readable storage medium according to an embodiment of the present disclosure.

In a fifth aspect, referring to FIG. 11, an embodiment of the present disclosure provides a computer-readable storage medium storing a computer program thereon which, when executed by a processor, causes at least one of:

- the method for feeding back channel state information according to any embodiment of the present disclosure in the first aspect; or
- the method for receiving channel state information according to any embodiment of the present disclosure in the second aspect, to be implemented.

To improve understanding of the technical solution provided in the embodiments of the present disclosure for those skilled in the art, the technical solution provided in the embodiments of the present disclosure will be further described in detail below with the help of accompanying drawings and examples.

In the embodiments of the present disclosure, the terms "index" and "indicator" are exchangeable. As used herein, the term "transmission" includes transmitting or receiving; the terminal may include various mobile devices, such as a mobile phone, a data card, a laptop, or various manufacturing devices of a factory; the base station may include various base stations such as macro, micro, home, or pico base stations, or the like. In the present disclosure, the value of the channel information is defined as follows: for example, assuming that the channel information is a three-dimensional matrix H, if there is only a colon ":" for a certain dimension, it means taking all values of that dimension, and if L1:L2 is taken for a certain dimension, it means taking values indexed from L1 to L2 in that dimension. For example, H(1: 3, 2: 4, :) means taking values indexed 1, 2, 3 in a first dimension, taking values indexed 2, 3, 4 in a second dimension, and taking all indexed values in a third dimension.

Example I

This example is used to illustrate construction of an encoder and a decoder in a neural network.

The artificial intelligence can be realized by means of a deep learning neural network. Here, the neural network is an AutoEncoder including an encoder and a decoder. The encoder is located in a terminal. Here, the terminal may include various mobile devices, such as a mobile phone, a data card, a laptop, or various manufacturing devices of a factory. The decoder is located at a base station including various base stations such as macro, micro, home, or pico base stations.

Figure 12:
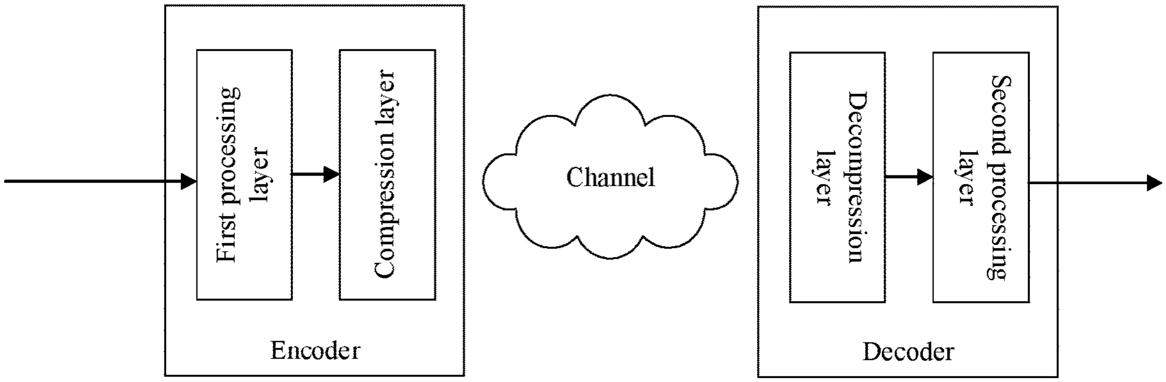
FIG. 12 is a schematic diagram of an architecture for feeding back channel state information according to an embodiment of the present disclosure.

In this example, an architecture for feeding back channel state information is shown in FIG. 12.

The channel information H is obtained by the terminal through receiving a reference signal, such as a channel state information reference signal (CSI-RS). The channel information is typically a complex matrix of Nt*Nr. Nt and Nr represent the number of transmitting antennas at the base station and the number of receiving antennas at the terminal, respectively. Here, the antennas may be logical antennas or various types of physical antennas.

Upon obtaining the channel information, the terminal pre-processes the channel information and inputs the pre-processed channel information into an encoder including a first processing layer and a compression layer. The first processing layer is a sub-neural network including C network layers, where an $i^{th}$ network layer includes $L_{e,i}$ nodes, at least one network layer weight $W_{e,i}$, 0 to 1 network layer bias $b_{e,i}$, and an activation function $S_{e,i}$, where i=1, . . . , C. The $i^{th}$ network layer may be a convolutional layer, a pooling layer, a fully-connected layer, or the like. The compression layer may be a fully-connected layer, or C1 convolutional layers, or a Recurrent Neural Network. For example, the Recurrent Neural Network may be a long short-term memory network (LSTM), or a gated recurrent neural network (GRU). At the base station side, a decoder corresponding to the encoder in the terminal is configured. The decoder includes a decompression layer and a second processing layer. The second processing layer includes L layers, an $i^{th}$ layer includes $L_{d,i}$ nodes, at least one network layer weight $W_{d,i}$, 0 to 1 network layer bias $b_{d,i}$, and an activation function $S_{d,i}$, where i=1, . . . , L. The $i^{th}$ layer may be a convolutional layer, a pooling layer, or a fully-connected layer, or a combination thereof, or a convolutional layer set composed of several convolutional layers, such as a residual network block. The decompression layer may be a fully-connected layer, or CI convolutional layers, or a Recurrent Neural Network. For example, the Recurrent Neural Network may be either a long short-term memory network (LSTM) or a gated recurrent neural network (GRU). The terminal inputs the pre-processed channel information into the encoder that outputs the channel state information, and then the channel state information is sent to the base station. In some implementations, the terminal may send the channel state information to the base station after quantization, encoding, and modulation. The base station receives the channel state information, and in some implementations, the base station may dequantize, demodulate, and decode the channel state information and use the channel state information as input of the decoder. The decoder outputs the channel information, the input data of the compression layer includes N elements, while the output data thereof includes M elements, where a ratio of M to N is called a compression ratio. For example, N is 2048 and M is 32, so the compression ratio is 32/2048=1/64.

Example II

This example is used to illustrate how to obtain parameters of the neural network.

Through offline training or a process combining offline training and online training, neural network parameters of a set of K0 AutoEncoders are obtained, where each AutoEncoder includes a pair of encoder and decoder. The terminal and the base station respectively store neural network parameters of the K0 pairs of encoders and decoders. When in use, the base station configures indexes of the K0 pairs of encoders and decoders through higher-layer signaling according to the channel condition, so that the terminal knows from which pair the neural network parameter of the encoder is used upon receiving the index. In other words, the base station configures indexes of the pairs of encoders and decoders, while the terminal receives an index of one of the pairs of encoders and decoders and determines a neural network parameter corresponding to the encoder; or, the terminal selects one encoder according to at least one factor, such as a scene of channel, angle spread, delay spread, or Doppler spread of channel, or the like, and sends information of the selected encoder to the base station through physical layer signaling and/or higher-layer signaling.

Figure 13:
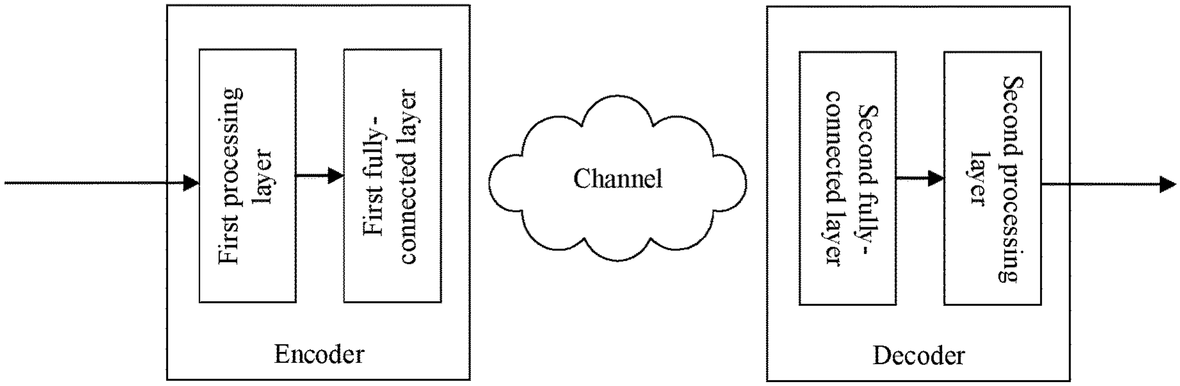
FIG. 13 is a schematic diagram of an architecture for feeding back channel state information according to an embodiment of the present disclosure.

In some implementations, the compression layer in the encoder and the decompression layer in the decoder are both fully-connected layers, and in this implementation, an architecture for feeding back channel state information is shown in FIG. 13. Each fully-connected layer has a weight being a two-dimensional matrix, which is a matrix of N*M in the compression layer, where N and M respectively represent input and output dimensions of the fully-connected layer corresponding to the compression layer; and which is a matrix of M*N in a decompression layer, where M and N respectively represent input and output dimensions of the fully-connected layer corresponding to the decompression layer. N is generally a relatively large number. For example, N=Nt*Ns*C, Nt, Ns and C respectively represent the number of antennas corresponding to the channel matrix, the number of sampling points in a truncated time domain channel, and the number of channels. When Nt=32, Ns=32, and C=2, N=2048, and in the case of a compression ratio of 1/4, M=512, so the number of parameters of the fully-connected layer is N*M=2048*512=1048576, that is, more than 1 million. The number of parameters is increased linearly with the number of antennas and the number of sampling points. Further, the input and output dimensions N and M are fixed, each pair of N and M is desired to transmit or reserve a parameter set. The base station may send the network parameter of the encoder to the terminal through higher-layer signaling.

Figure 14:
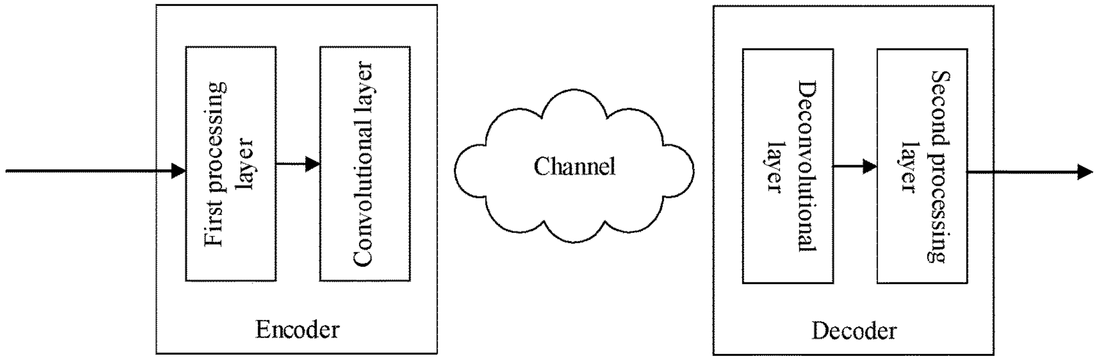
FIG. 14 is a schematic diagram of an architecture for feeding back channel state information according to an embodiment of the present disclosure.

In some implementations, the compression layer in the encoder is a convolutional layer block composed of a set of convolutional layers, for example, a convolutional layer block obtained by a plurality of convolutional layers arranged in series and/or in parallel, such as a residual block (resblock), a dense block (denseblock), or a convolutional block including a plurality of serial links. In the present disclosure, the terms "convolutional layer block" and "convolutional layer set" are equivalent concepts that can be used in exchange. In this example, an architecture for feeding back channel state information is shown in FIG. 14, where a plurality of convolutional layer blocks constitute a compression layer. The base station sends parameters of one or more convolutional layer blocks to the terminal by configuring high-layer signaling and/or physical layer signaling, and the terminal acquires the parameters of the one or more convolutional layer blocks by receiving the higher-layer signaling and/or physical layer signaling. The parameters of the convolutional layer blocks include but are not limited to at least one of: a convolution kernel size of each convolutional layer, a convolution kernel step of each convolutional layer, a data filling mode of each convolutional layer, a convolution kernel weight of each convolutional layer, or an activation function of each convolutional layer.

In some implementations, the decompression layer in the decoder is a deconvolutional layer block formed by a set of deconvolutional layers, for example, a deconvolutional layer block obtained by a plurality of deconvolutional layers arranged in series and/or in parallel, such as a transposed convolutional layer, an atrous convolutional layer, or the like. In the present disclosure, the terms "deconvolutional layer block" and "deconvolutional layer set" are equivalent concepts. Parameters of the deconvolutional block corresponding to each decoder and parameters of the convolutional layer block corresponding to each encoder may be obtained by means of online or offline training, and occur in pairs. The number of convolutional layers or deconvolutional layers in the convolutional layer block or the deconvolutional layer block is determined by at least one of: the number of transmitting antennas, the number of receiving antennas, a channel rank, the number of physical resource blocks, the number of time domain sampling points, or a compression ratio. Since a size of each convolutional layer determines sizes of input and output of the convolutional layer block, each convolutional layer controls the sizes of input and output of the convolutional layer block with a different step. The situation is similar for the deconvolutional layer.

Example III

This example is used to illustrate pre-processing of input data, and grouping of channel information, where the channel information is a time domain channel.

In a compression layer or decompression layer, if the input and output elements are fixed in terms of number and size, a neural network parameter set is desired to be configured and trained for each different input or output size. For example, the input size of the compression layer is N and the output size is M, where N is determined by the number of antennas Nt and the number of sampling points Ns, i.e., N=C*Nt*Ns, where C is a channel dimension which is generally equal to 2. Values of the neural network parameters may be changed by changing the number of antennas or the number of sampling points. In practice, the number of antennas is diverse, and the number of sampling points may also be different due to different scenes of channel, leading to problems with transmission or storage of multiple neural network parameter sets. One way to reduce the number of neural network parameter sets is to train a neural network parameter set of a reference size, for example, neural network parameters corresponding to the number of antennas Nt1 and the number of sampling points Ns1. For the case where Nt is not equal to Nt1 or Ns is not equal to Ns1, the input data is grouped, downsampled or zero-padded to match the dimension of Nt1*Ns1. Here, Nt1 and Ns1 are positive integers greater than 1, and without any loss of generality, it is assumed here that Nt1=16 and Ns1=16, and other values are similar.

In some implementations, the channel information is grouped based on polarization directions for the antenna dimension. For example, the channel information is H, which is a matrix of Nt*Ns*C, and may be a matrix obtained by performing fast Fourier transform on the obtained channel information to obtain a time domain channel, and then truncating the time domain channel at time domain points and performing normalization on the truncated time domain channel. For example, Nt=32, Ns=16, and C=2, and the channel dimension may be a first dimension, the processing of which is similar to that of the third dimension. The channel information is arranged in the antenna dimension such that channels corresponding to a first polarization direction are arranged before channels corresponding to a second polarization direction. For example, the first polarization direction is polarization with a polarization angle of P1, the second polarization direction is polarization with a polarization angle of P2, P2 is different from P1, and P1 and P2 may each take a value from at least one of −45°, 0°, 90°, or +45°. For example, when Nt=32, rows 1 to Nt/2 correspond to channel information of the first polarization direction, and rows Nt/2+1 to Nt correspond to channels of the second polarization direction. The channel information is divided into K groups according to the polarization direction, where K=2. It should be noted that the grouping here may also be made according to the number of transmitting antennas, and instead of being divided into two groups according to the polarized antenna, the channel information may be divided into K groups according to the number of transmitting antennas, where K>2. A first group corresponds to the channel information H(1:Nt/2, :, :), and a second group corresponds to the channel information H(1+Nt/2:Nt, :, :). The antenna polarization direction here includes a polarization direction of the transmitting antenna and/or a polarization direction of the receiving antenna. In some implementations, it is desirable to feed back a polarization phase between different polarized antenna groups. After a receiving end obtains estimated values of the K groups of channel information, such as the K groups of second channel information, through the decompression module, a reverse operation is performed according to the above grouping rules, and the estimated values of the K groups of channel information are linked into the estimated value of the channel information, that is, the second channel information.

In some implementations, the number of antennas Nt in the channel information is closer to the number of antennas Nt1 in the reference neural network, and when Nt>Nt1, the antennas may be downsampled. For example, channel information H(1:Nt1, :, :) corresponding to first 1 to Nt1, or channel information H((Nt−Nt1+1):Nt, :, :) corresponding to last (Nt−Nt1+1):Nt, or channel information corresponding to an odd antenna index, or channel information corresponding to an even antenna index, is taken. Alternatively, Nt1/2 pieces of channel information are taken from each same polarization direction. For example, Nt1/2 pieces of channel information H (1: Nt1/2, :, :) for a first polarization direction and Nt1/2 pieces of channel information H (Nt/2+1: Nt/2+Nt1/2, :, :) for a second polarization direction are taken and then combined.

After the receiving end obtained an estimated value of the downsampled channel information, for example, the downsampled second channel information, through the decompression module, a reverse operation is performed according to the above downsampling rules. For example, upsampling (including reverse operations such as interpolation, upsampling, deconvolutional layer (Transpose Convolution Layer), fully-connected layer, or the like) is performed to obtain the estimated value of the channel information, that is, the second channel information.

In some implementations, the number of antennas Nt in the channel information is smaller than the number of antennas Nt1 in the reference neural network, and when Nt<Nt1, i.e., the channel information is H0, which is a matrix having dimensions of Nt*Ns*C, which is desired to be zero-padded to a matrix H having dimensions of Nt1*Ns*C. The zero padding may be performed in the antenna dimension. For example, zero padding is performed on channel information corresponding to first 1 to (Nt1−Nt+1) in the first dimension of H, i.e., H(1:Nt1−Nt, :, :) takes a value of zero, and then last (Nt1−Nt+1):N rows take values of H0; or zero padding is performed on channel information corresponding to last (Nt1−Nt+1):Nt1, i.e., H((Nt1−Nt+1):Nt1, :, :) takes a value of 0, and channels 1: Nt take values of H0; or every other element of H takes the value of H0, while zeros are padded elsewhere. Alternatively, zero padding is performed in the same polarization direction, that is, Nt/2 pieces of channel information of channels in a first polarization direction of H0 are taken for the first polarization direction, i.e. the channel information of the first polarization direction of H0 is taken for H(1:Nt/2, :, :), and Nt/2 pieces of channel information in a second polarization direction of H0 are taken for the second polarization direction, i.e. the channel information of the second polarization direction of H0 is taken for H(1+Nt1/2:Nt1/2+Nt/2, :, :), while channel information corresponding to other antenna indexes takes a value of zero. For example, when Nt1=16 and Nt=8, the channel information H(1: 4, :, :) of the first polarization direction takes a value of the channel information H0(1: 4, :, :) of the first polarization direction, the channel information H(9:12, :, :) of the second polarization direction takes a value of the channel information H0(5:8, :, :) of the second polarization direction, and the channel information corresponding to other antenna indexes takes a value of zero, i.e., H(5:8, :, :) and H(13:16, :, :) each take a value 0.

After the receiving end obtained an estimated value of the zero-padded channel information, for example, the zero-padded second channel information, through the decompression module, a reverse operation is performed according to the above zero padding rules. For example, a zero removal operation (i.e., removing the padded zeros) is performed to obtain the estimated value of the channel information, that is, the second channel information.

In some implementations, the grouping in the antenna dimension may be performed according to the number of receiving antennas or a channel rank (number of data streams). For example, the channel information is H, which is a matrix of Nt*Ns*C, and may be a matrix obtained by performing fast Fourier transform on the obtained channel information to obtain a time domain channel, and then truncating the obtained time domain channel at time domain points and performing normalization on the truncated time domain channel. For example, when Nt=Ntx*K, where Ntx represents the number of transmitting antennas, such as 16, Ns=16 and C=2, where K represents the number of receiving antennas, the channel dimension may be a first dimension, the processing of which is similar to that of the third dimension. The channel information is ranked in the channel dimension according to indexes of receiving antennas. For example, a channel corresponding to a first receiving antenna is ranked first, then a channel corresponding to a second receiving antenna, so on and so forth, until channels corresponding to all the receiving antennas are ranked. For example, a row of an $i^{th}$ antenna index set Ai corresponds to channel information of an $i^{th}$ receiving antenna, where Ai=integers from Ntx*(i−1)+1 to Ntx*i, i=1, . . . , K, and K represents the number of receiving antennas. The channel information is divided into K groups according to the number of receiving antennas, and an $i^{th}$ group corresponds to the channel information H(Ai, :, :).

In some implementations, the grouping in the antenna dimension may be performed according to the channel rank (number of data streams). For example, the channel information is H, which is a matrix of Nt*Ns*C, and may be a matrix obtained by performing fast Fourier transform on the obtained channel information to obtain a time domain channel, and then truncating the obtained time domain channel at time domain points and performing normalization on the truncated time domain channel. For example, when Nt=Ntx*K, where Ntx represents the number of transmitting antennas, such as 16, Ns=16 and C=2, where K is the channel rank or the number of data streams, the channel dimension may be a first dimension, the processing of which is similar to that of the third dimension. The channel information is ranked in the channel dimension according to channel ranks or indexes of data streams. For example, a channel corresponding to a first data stream is ranked first, then a channel corresponding to a second data stream, so on and so forth, until channels corresponding to all the data streams are ranked. For example, when Nt=Ntx*K, where Ntx represents the number of transmitting antennas, such as 16, a row of an $i^{th}$ antenna index set Ai corresponds to channel information of an $i^{th}$ data stream, where Ai=integers from Ntx*(i−1)+1 to Ntx*i, i=1, . . . , K, and K is the channel rank or the number of data streams. The channel information is divided into K groups according to the channel rank or the number of data streams, and an $i^{th}$ group corresponds to the channel information H(Ai, :, :).

In some implementations, the grouping in the sampling point dimension is performed according to the number of sampling points. For example, the channel information is H, which is a matrix of Nt*Ns*C, and may be a matrix obtained by performing fast Fourier transform on the obtained channel information to obtain a time domain channel, and then truncating the obtained time domain channel at time domain points and performing normalization on the truncated time domain channel. For example, the number of antennas Nt=16, Ns=16 and C=2, where the channel dimension may be a first dimension, the processing of which is similar to that of the third dimension. The channel information is indexed and arranged in the sampling point dimension according to sizes of the sampling points. However, since the delay spread of the channel differs in the same scenario, for example, the delay spread is smaller indoors and larger in urban macros, the number of sample points representing the truncation of the channel information may differ in different scenarios. The channel information is divided into K groups according to the number of sampling points, where the sampling points are ranked from large to small according to their indexes and divided into K groups, i.e., form K sampling point sets, assuming that an index set of an $i^{th}$ sampling point set is Bi=integers from Ns/K*(i−1)+1 to Ns/K*i, and the $i^{th}$ sampling point set corresponds to the channel information H(:, Bi, :), i=1, . . . , K, where K is a positive integer.

After a receiving end obtains estimated values of the K sets of channel information, such as the K sets of second channel information, through the decompression module, a reverse operation is performed according to the above grouping rules, and the estimated values of the K sets of channel information are linked into the estimated value of the channel information, that is, the second channel information. Here, the case of grouping the input data according to at least one of the number of receiving antennas, the number of data streams, or the number of sampling point sets is included.

Figure 15:
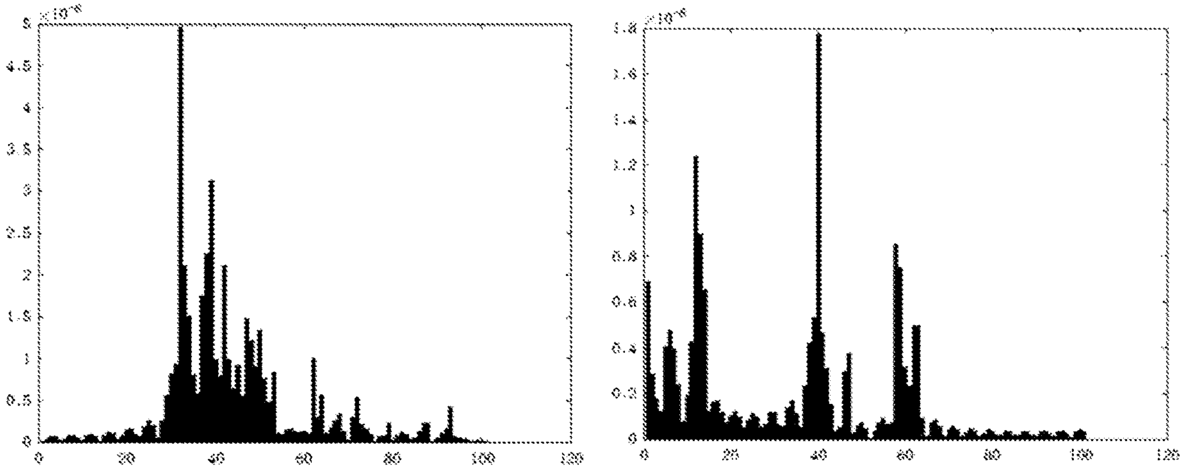
FIG. 15 is a schematic diagram of sampling point locations according to an embodiment of the present disclosure.

In some implementations, due to different distances of different users to the base station, referring to FIG. 15, positions of non-zero sampling points or sampling points greater than a threshold TO may differ. When the number of sampling points Ns0 representing the channel is relatively close to Ns, if Ns0<Ns, zero padding is desired in the sampling point dimension, namely, a channel corresponding to H(:, Ns0:Ns, :) is assigned a value 0; and if Ns0>Ns, the channel information is desired to be further truncated, so that the number of the sampling points after the truncation is Ns, and an initial position of a truncation window or an index value of a point where the truncation is performed is fed back.

Similarly, the decompressed channel information is also desired to be subjected to zero removal or upsampling, to obtain the final channel information.

The K groups of channel information are input into an encoder respectively to obtain channel state information of the K groups of channel information, respectively, and the K groups of channel state information are quantized and jointly coded to obtain final channel state information. The channel state information is fed back to the base station.

After obtaining the channel state information, the base station decodes the channel state information to obtain K groups of channel state information, which are respectively input to a decoder to obtain K groups of channel information, and then, the K groups of channel state information are restored in a dimension to obtain the final channel information. For example, in the channel dimension, a first group of channel information is firstly placed, and then a second group of channel information is placed, and the like, to restore the final channel information.

It should be noted that, in practice, the above methods of grouping the channel information may be used in combination with each other.

Example IV

This example is used to illustrate pre-processing of input data, and grouping of channel information, where the channel information is a frequency domain channel.

In a compression layer or decompression layer, if the input and output elements are fixed in terms of number and size, a parameter set is desired to be configured and trained for each different input or output size. For example, the input size of the compression layer is N and the output size is M, where N is determined by the number of antennas Nt and the frequency domain granularity Nf, i.e., N=C*Nt*Nf, where C is a channel dimension which is generally equal to 2, Nt is the number of antennas, and Nf is the frequency domain granularity which may be in units of subcarriers or physical resource blocks or sub-bands. One physical resource block may include a plurality of subcarriers, such as 6, 12 or the like, one sub-band includes a plurality of physical resource blocks, and one or more frequency domain granularities form one frequency domain granularity set. Values of the neural network parameters may be changed by changing the number of antennas Nt or the frequency domain granularity Nf. In practice, the number of antennas is diverse, and the frequency domain granularity Nf is related to the configured bandwidth, leading to problems with transmission or storage of multiple neural network parameter sets. One way to reduce the number of neural network parameter sets is to train a neural network parameter set of a reference size, for example, neural network parameters corresponding to the number of antennas Nt1 and the frequency domain granularity Ns1. For the case where Nt>Nt1 or Ns>Ns1, the input data is grouped, downsampled or zero-padded to match the dimension of Nt1*Ns1. Here, Nt1 and Ns1 are positive integers greater than 1, and without any loss of generality, it is assumed here that Nt1=16 and Ns1=16, and other values are similar.

In some implementations, the channel information is grouped based on polarization directions for the antenna dimension. For example, the channel information is H, which is a matrix of Nt*Nf*C, and may be a matrix obtained by normalizing the obtained channels. For example, Nt=32, Nf=16, and C=2, and the channel dimension may be a first dimension, the processing of which is similar to that of the third dimension. The channel information is arranged in the antenna dimension such that a channel corresponding to a first polarization direction is ranked first, then a channel corresponding to a second polarization direction. For example, the first polarization direction is polarization with a polarization angle of P1, the second polarization direction is polarization with a polarization angle of P2, P2 is different from P1, and P1 and P2 may each take a value from at least one of −45°, 0°, 90°, or +45°. For example, when Nt=32, rows 1 to Nt/2 correspond to channel information of the first polarization direction, and rows Nt/2+1 to Nt correspond to channels of the second polarization direction. The channel information is divided into K groups according to the polarization direction, where K=2. A first group corresponds to the channel information H(1:Nt/2, :, :), and a second group corresponds to the channel information H(1+Nt/2:Nt, :, :). The antenna polarization direction here includes a polarization direction of the transmitting antenna and/or a polarization direction of the receiving antenna. In some implementations, it is desirable to feed back a polarization phase between different polarized antenna groups.

In some implementations, the grouping in the antenna dimension may be performed according to the number of receiving antennas or a channel rank (number of data streams). For example, the channel information is H, which is a matrix of Nt*Nf*C, and may be a matrix obtained by normalizing the obtained channel information. For example, when Nt=Ntx*K, where Ntx represents the number of transmitting antennas, such as 16, Nf=16 and C=2, where K represents the number of receiving antennas, the channel dimension may be a first dimension, the processing of which is similar to that of the third dimension. The channel information is ranked in the channel dimension according to indexes of receiving antennas. For example, a channel corresponding to a first receiving antenna is ranked first, then a channel corresponding to a second receiving antenna, so on and so forth, until channels corresponding to all the receiving antennas are ranked. For example, a row of an $i^{th}$ antenna index set Ai corresponds to channel information of an $i^{th}$ receiving antenna, where Ai=integers from Ntx*(i−1)+1 to Ntx*i, i=1, . . . , K, and K represents the number of receiving antennas. The channel information is divided into K groups according to the number of receiving antennas, and an $i^{th}$ group corresponds to the channel information H(Ai, :, :).

In some implementations, the grouping in the antenna dimension may be performed according to the channel rank (number of data streams). For example, the channel information is H, which is a matrix of Nt*Nf*C, and may be a matrix obtained by normalizing the obtained channel information. For example, when Nt=Ntx*K, where Ntx represents the number of transmitting antennas, such as 16, Nf=16 and C=2, where K is the channel rank or the number of data streams, the channel dimension may be a first dimension, the processing of which is similar to that of the third dimension. The channel information is ranked in the channel dimension according to channel ranks or indexes of data streams. For example, a channel corresponding to a first data stream is ranked first, then a channel corresponding to a second data stream, so on and so forth, until channels corresponding to all the data streams are ranked. For example, when Nt=Ntx*K, where Ntx represents the number of transmitting antennas, such as 16, a row of an $i^{th}$ antenna index set Ai corresponds to channel information of an $i^{th}$ data stream, where Ai=integers from Ntx*(i−1)+1 to Ntx*i, i=1, . . . , K, and K is the channel rank or the number of data streams. The channel information is divided into K groups according to the channel rank or the data stream, and an $i^{th}$ group corresponds to the channel information H(Ai, :, :).

In some implementations, the grouping is performed according to the frequency domain granularity. For example, the channel information is H, which is a matrix of Nt*Nf*C, and may be a matrix obtained by normalizing the obtained channel information. For example, the number of antennas Nt is, for example, 16, Nf=32 and C=2, and the channel dimension may be a first dimension, the processing of which is similar to that of the third dimension. The channel information is arranged in the frequency domain according to indexes of frequency domain granularities, but the system may correspond to channels of different bandwidths. The channel information is divided into K groups according to the frequency domain granularity, where the frequency domain granularities are ranked by size and divided into K groups, assuming that an index set of an $i^{th}$ frequency domain granularity set is Ci=integers from Nf/K*(i−1)+1 to Nf/K*i, and the $i^{th}$ frequency domain granularity set corresponds to the channel information H(:, Ci, :), i=1, . . . , K, where K is a positive integer.

In some implementations, when the frequency domain granularity Nf is relatively close to Ns, if Nf<Ns, zero padding is desired in the frequency domain dimension, namely, a channel corresponding to H(:, Nf:Ns, :) is assigned a value 0; and if Nf>Ns, the channel information is desired to be further truncated, so that the number of the sampling points after the truncation is Ns, and an index corresponding to the frequency domain granularity of a current stage is fed back. Another approach is to downsample a frequency domain channel, for example, to select channel information corresponding to only odd or even frequency domain granularity indexes, i.e., select channels corresponding to H(:, 1: 2:Ns, :) or H(:, 2: 2:Ns, :) as input to an encoder.

In some implementations, the frequency domain granularity is subband, and the number of physical resource blocks included in the subband is related to a compression ratio and a bandwidth. For example, the smaller the compression ratio is, the less physical resource blocks are included in the subband. For example, in the case of 100 physical resource blocks, each subband includes 8 physical resource blocks at a compression ratio 1/20, and each subband includes 4 physical resource blocks at a compression ratio 1/10. On the other hand, the number of physical resource blocks included in the subband is in direct proportion to the bandwidth. For example, each subband includes 4 physical resource blocks at a bandwidth of 10M, and each subband includes 8 physical resource blocks at a bandwidth of 20M, so on and so forth.

The K groups of channel information are input into an encoder respectively to obtain channel state information of the K groups of channel information, respectively, and the K groups of channel state information are quantized and jointly coded to obtain final channel state information. The channel state information is fed back to the base station.

After obtaining the channel state information, the base station decodes the channel state information to obtain K groups of channel state information, which are respectively input to a decoder to obtain K groups of channel information, and then, the K groups of channel state information are restored in a dimension to obtain the final channel information. For example, in the channel dimension, a first group of channel information is firstly placed, and then a second group of channel information is placed, and the like, to restore the final channel information.

It should be noted that, in practice, the above methods of grouping the channel information may be used in combination with each other.

Example V

The case where the number of antennas is smaller than the number of antennas specified by a network is supplemented.

For example, the number of antennas is 8, but the number of antennas in the input of the network is 32, then zero padding is desired to make it consistent with the number of antennas in the input of the network.

For example:

1) zero padding is performed on the number of antennas in the same polarization direction;

2) zero padding is performed at the end of an array;

3) zero padding is performed on multiple columns or rows of antennas in the same polarization direction; or 4) zero padding is performed on input in a spatial dimension.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, features, characteristics and/or elements described in connection with a particular embodiment may be used alone, or may be used in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A method for feeding back channel state information, comprising:

determining a neural network parameter, and constructing an encoder according to the neural network parameter;

compressing channel information with the encoder to obtain channel state information; and feeding back the channel state information, wherein compressing the channel information with the encoder to obtain the channel state information comprises:

determining, according to a channel parameter, a group number K of the channel information; and dividing the channel information into K groups according to the channel parameter to obtain K groups of channel information as pre-processed channel information, wherein each group of channel information has a dimension matched with a dimension of the input data of the encoder, where K is a positive integer, and the channel parameter comprises at least one of: a number of antenna polarization directions, a number of antennas, a number of data streams, a number of time domain sampling point sets, or a number of frequency domain granularity sets, and compressing each of the K groups of channel information with the encoder, respectively, to obtain K groups of channel state information.

2. The method according to claim 1, wherein the group number K of the channel information is further determined according to a dimension of the channel information and the dimension of the input data of the encoder.

3. The method according to claim 1, wherein dividing the channel information into K groups according to the channel parameter comprises at least one of:

grouping the channel information according to the number of antenna polarization directions;

grouping the channel information according to the number of antennas;

grouping the channel information according to the number of data streams;

grouping the channel information according to the number of time domain sampling point sets; or grouping the channel information according to the number of frequency domain granularity sets.

4. The method according to claim 3, wherein dividing the channel information into K groups according to the channel parameter comprises at least one of:

dividing channel information corresponding to a same polarization direction into a same group of channel information;

dividing channel information corresponding to a same antenna group into a same group of channel information, where the antenna group comprises at least one of a transmitting antenna group or a receiving antenna group;

dividing channel information corresponding to a same data stream into a same group of channel information;

dividing channel information corresponding to a same sampling point set into a same group of channel information; or dividing channel information corresponding to a same frequency domain granularity set into a same group of channel information.

5. The method according to claim 1, further comprising:

after compressing each of the K groups of channel information with the encoder, respectively, to obtain K groups of channel state information, acquiring and feeding back an inter-group phase of the groups of channel information.

6. The method according to claim 1, further comprising: after compressing each of the K groups of channel information with the encoder, respectively, to obtain K groups of channel state information, performing, according to group indexes corresponding to the K groups of channel state information, joint coding on the K groups of channel state information.

7. The method according to claim 1, wherein compressing the channel information with the encoder to obtain the channel state information comprises:

downsampling the channel information to obtain downsampled channel information as the pre-processed channel information, wherein the downsampled channel information has a dimension matched with the dimension of the input data of the encoder.

8. The method according to claim 7, wherein downsampling the channel information comprises at least one of:

performing downsampling on the channel information in an antenna dimension;

performing downsampling on the channel information in a time domain sampling point dimension; or performing downsampling on the channel information in a frequency domain granularity dimension.

9. The method according to claim 1, wherein compressing the channel information with the encoder to obtain the channel state information comprises:

performing zero padding on the channel information to obtain zero-padded channel information as the pre-processed channel information, wherein the zero-padded channel information has a dimension matched with the dimension of the input data of the encoder.

10. The method according to claim 9, wherein performing zero padding on the channel information comprising at least one of:

performing zero padding on the channel information in an antenna dimension in the same polarization direction;

performing zero padding on the channel information in a time domain sampling point dimension; or performing zero padding on the channel information in a frequency domain granularity dimension.

11. The method according to claim 1, wherein the determining the neural network parameter, and constructing the encoder according to the neural network parameter comprises:

selecting, according to channel factor information, a neural network parameter of one AutoEncoder from preconfigured candidate neural network parameters of a set of at least one AutoEncoder as the neural network parameter; wherein each AutoEncoder comprises a pair of encoder and decoder.

12. The method according to claim 1, wherein the determining the neural network parameter, and constructing the encoder according to the neural network parameter comprises:

receiving neural network parameter information; and determining the neural network parameter according to the neural network parameter information.

13. A terminal, comprising:

at least one processor; and a memory having at least one computer program stored thereon which, when executed by the at least one processor, causes the at least one processor to implement the method for feeding back channel state information according to claim 1; and at least one I/O interface connected between the at least one processor and the memory and configured to enable information interaction between the at least one processor and the memory.

14. A non-transitory computer-readable storage medium having a computer program stored thereon which, when executed by a processor, causes the method for feeding back channel state information according to claim 1 to be implemented.

15. A method for receiving channel state information, comprising:

determining a neural network parameter, and constructing a decoder according to the neural network parameter;

receiving channel state information; and decompressing the channel state information with the decoder to obtain second channel information, wherein the channel state information comprises K groups of channel state information obtained by compressing each of K groups of channel information, where K is a positive integer; and decompressing the channel state information with the decoder to obtain the second channel information comprises:

decompressing each of the K groups of channel state information, respectively, to obtain K groups of channel information; and combining the K groups of channel information according to a channel parameter to obtain the second channel information, wherein the channel parameter comprises at least one of: a number of antenna polarization directions, a number of antennas, a number of data streams, a number of time domain sampling point sets, or a number of frequency domain granularity sets.

16. A base station, comprising:

at least one processor; and a memory having at least one computer program stored thereon which, when executed by the at least one processor, causes the at least one processor to implement the method for receiving channel state information according to claim 15; and at least one I/O interface connected between the at least one processor and the memory and configured to enable information interaction between the at least one processor and the memory.

17. A non-transitory computer-readable storage medium having a computer program stored thereon which, when executed by a processor, causes the method for receiving channel state information according to claim 15 to be implemented.

* * * * *